United States Patent
Yoshinori et al.

(10) Patent No.: US 9,444,293 B2
(45) Date of Patent: Sep. 13, 2016

(54) ROTARY ELECTRIC MACHINE

(71) Applicant: MITSUBISHI ELECTRIC CORPORATION, Chiyoda-ku, Tokyo (JP)

(72) Inventors: Manabu Yoshinori, Tokyo (JP); Soichi Sato, Tokyo (JP); Yoshihiko Onishi, Tokyo (JP); Katsunari Takagi, Tokyo (JP); Keisuke Shimomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 384 days.

(21) Appl. No.: 13/935,784

(22) Filed: Jul. 5, 2013

(65) Prior Publication Data

US 2014/0239754 A1 Aug. 28, 2014

(30) Foreign Application Priority Data

Feb. 22, 2013 (JP) ................................ 2013-033373

(51) Int. Cl.
*H02K 1/18* (2006.01)
*H02K 5/04* (2006.01)

(52) U.S. Cl.
CPC ............... *H02K 1/185* (2013.01); *H02K 5/04* (2013.01)

(58) Field of Classification Search
CPC .................................. H02K 1/18; H02K 5/20
USPC ............ 310/54, 216.008, 216.009, 216.118, 310/216.134, 216.113
See application file for complete search history.

(56) References Cited

U.S. PATENT DOCUMENTS

| | | | | |
|---|---|---|---|---|
| 2,704,693 A | * | 3/1955 | Schwan | ........................ 384/519 |
| 5,616,973 A | * | 4/1997 | Khazanov et al. | ............. 310/54 |
| 6,300,693 B1 | * | 10/2001 | Poag et al. | ...................... 310/54 |

FOREIGN PATENT DOCUMENTS

| | | |
|---|---|---|
| JP | 2001-025187 A | 1/2001 |
| JP | 2009-60760 A | 3/2009 |
| JP | 2009-131083 A | 6/2009 |
| JP | 2010-114951 A | 5/2010 |
| JP | 2010-259315 A | 11/2010 |

OTHER PUBLICATIONS

Japanese Office Action, mailed Feb. 18, 2014, Application No. 2013-033373.

* cited by examiner

*Primary Examiner* — Quyen Leung
*Assistant Examiner* — Noli Manaloto
(74) *Attorney, Agent, or Firm* — Sughrue Mion, PLLC

(57) ABSTRACT

In a rotary electric machine, a cylindrical stator core holding frame is cantilevered on a housing. A cylindrical stator core is fitted together and held inside the stator core holding frame. The stator core holding frame includes: a flange portion that is fixed to the housing; and a frame cylindrical portion that is coupled to the flange portion, and that holds the stator core. A thickness of the flange portion is greater than a thickness of the frame cylindrical portion.

7 Claims, 5 Drawing Sheets

ROTARY ELECTRIC MACHINE

BACKGROUND OF THE INVENTION

1. Field of the Invention

The present invention relates to a rotary electric machine in which a stator core holding frame that holds a stator core is cantilevered on a housing.

2. Description of the Related Art

In conventional hybrid vehicle driving apparatuses, a stator that is formed by arranging stator segments into a ring shape is fixed by being press-fitted inside a stator retaining ring. A flange portion is formed on one axial end portion of the stator retaining ring. The flange portion is fixed to a housing by bolts (see Patent Literature 1, for example).

In conventional rotary electric machine stators, an outer cylinder is fitted and fixed onto an outer circumference of a stator core. A plurality of flange portions that project radially outward are formed on one axial end portion of the outer cylinder so as to be spaced apart from each other circumferentially. Penetrating apertures for fixing the outer cylinder to the housing are disposed on the respective flange portions (see Patent Literature 2, for example).

CITATION LIST

Patent Literature

[Patent Literature 1]
Japanese Patent Laid-Open No. 2001-25187 (Gazette)
[Patent Literature 2]
Japanese Patent Laid-Open No. 2010-259315 (Gazette)

SUMMARY OF THE INVENTION

In conventional rotary electric machines such as those described above, because the constructions are such that a stator core holding frame (the stator retaining ring or the outer cylinder) is cantilevered on the housing, fixing of the stator core holding frame onto the housing is facilitated. However, because the stator core holding frame is a single-piece construction that is produced by drawing a steel sheet, and the flange portions for fixing to the housing are also formed integrally on one axial end portion, one problem has been that it has not been possible to increase thickness dimensions of the flange portions due to the constraints of drawing, making design freedom lower from the viewpoint of strength.

The present invention aims to solve the above problems and an object of the present invention is to provide a rotary electric machine that can increase design freedom from a viewpoint of strength while cantilevering a stator core holding frame on a housing.

In order to achieve the above object, according to one aspect of the present invention, there is provided a rotary electric machine including: a housing; a cylindrical stator core holding frame that is cantilevered on the housing; a cylindrical stator core that includes plurality of segmented cores that are disposed in an annular shape, and that is held by being fitted inside the stator core holding frame; and a rotor that is rotatably disposed inside the stator core, wherein: the stator core holding frame includes: a flange portion that is fixed to the housing; and a frame cylindrical portion that is coupled to the flange portion, and that holds the stator core; and a thickness of the flange portion is greater than a thickness of the frame cylindrical portion.

In the dynamoelectric machine according to the present invention, because the stator core holding frame is configured by coupling a flange portion that is fixed to the housing and a frame cylindrical portion that holds the stator core, and the thickness of the flange portion is made greater than the thickness of the frame cylindrical portion, strength of the flange portion can be increased while cantilevering the stator core holding frame on the housing, enabling design freedom to be increased from the viewpoint of strength.

DETAILED DESCRIPTION OF THE PREFERRED EMBODIMENTS

Preferred embodiments of the present invention will now be explained with reference to the drawings.

Embodiment 1

Figure 1:
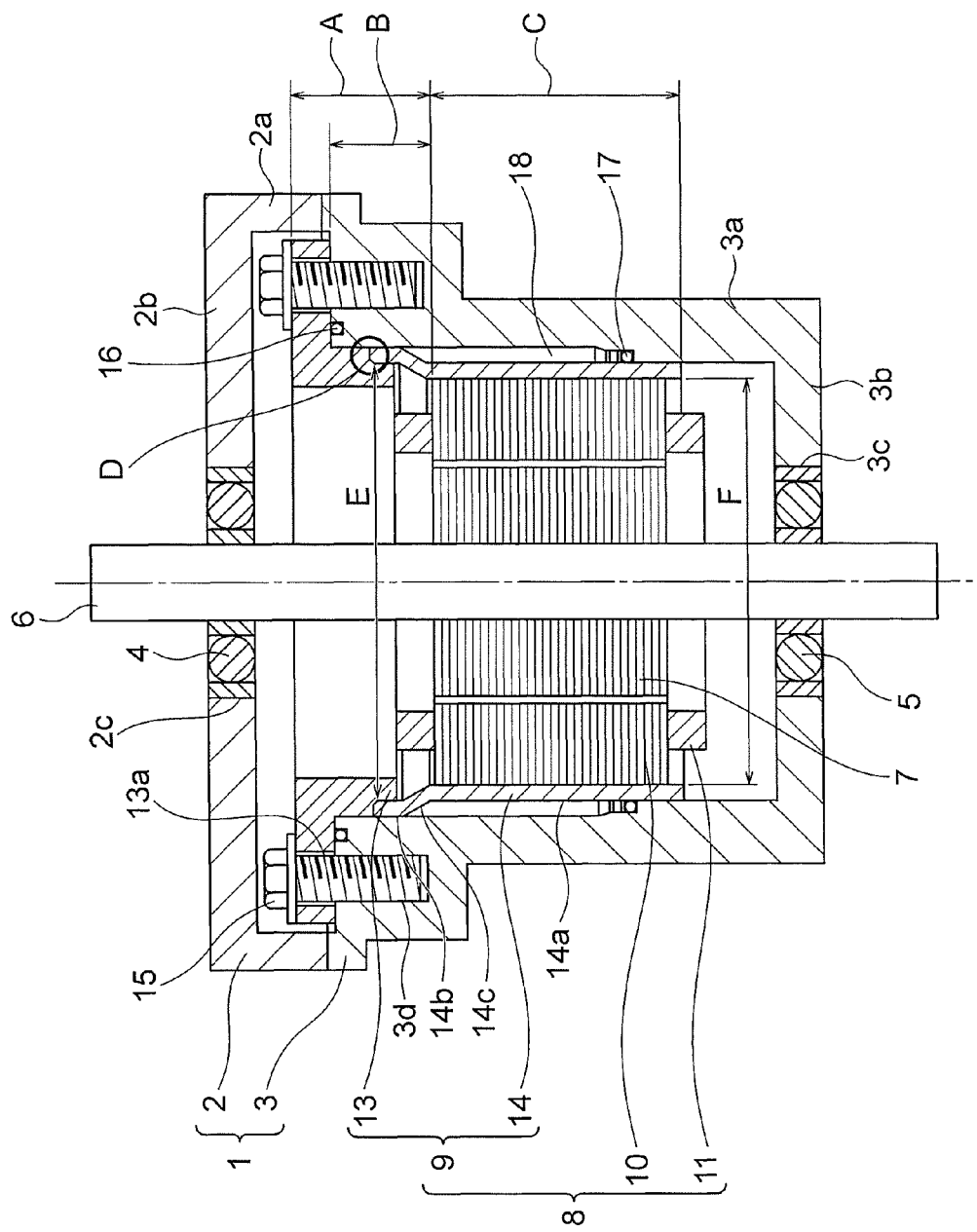
FIG. 1 is a cross section that is parallel to a shaft axis of a rotary electric machine according to Embodiment 1 of the present invention.

FIG. 1 is a cross section that is parallel to a shaft axis of a rotary electric machine according to Embodiment 1 of the present invention. In FIG. 1, a housing 1 has: a first housing member 2; and a second housing member 3. The first housing member 2 has: a first housing cylindrical portion 2a; and a first housing disk portion 2b. The first housing disk portion 2b is disposed on an axial end portion of the first housing cylindrical portion 2a at an opposite end from the second housing member 3.

A first bearing aperture 2c is disposed centrally on the first housing disk portion 2b. A first bearing 4 is mounted into the first bearing aperture 2c.

The second housing member 3 has: a second housing cylindrical portion 3a; and a second housing disk portion 3b. The second housing disk portion 3b is disposed on an axial end portion of the second housing cylindrical portion 3a at an opposite end from the first housing member 2.

A second bearing aperture 3c is disposed centrally on the second housing disk portion 3b. A second bearing 5 is mounted into the second bearing aperture 3c.

An end surface at an opening end of the first housing cylindrical portion 2a (at an opposite end from the first housing disk portion 2b) is abutted to an end surface at an opening end of the second housing cylindrical portion 3a (at an opposite end from the second housing disk portion 3b) and fixed.

A shaft 6 is rotatably held in the housing 1 by means of the first and second bearings 4 and 5. A rotor 7 is fixed to an intermediate portion of the shaft 6. The rotor 7 can rotate relative to the housing 1 together with the shaft 6. The rotor 7 has: a rotor core that is configured by laminating electromagnetic steel sheets; and a plurality of magnets that are embedded in the rotor core.

A stator 8 is fixed to the second housing member 3. The rotor 7 and the stator 8 are accommodated inside the housing 1. The stator 8 has: a cylindrical stator core holding frame 9; a cylindrical stator core 10 that is held by the stator core holding frame 9; and a plurality of coils 11 that are wound onto the stator core 10.

The stator core 10 surrounds the rotor 7. Specifically, an inner circumferential surface of the stator core 10 faces an outer circumferential surface of the rotor 7 so as to have a gap interposed.

Figure 2:
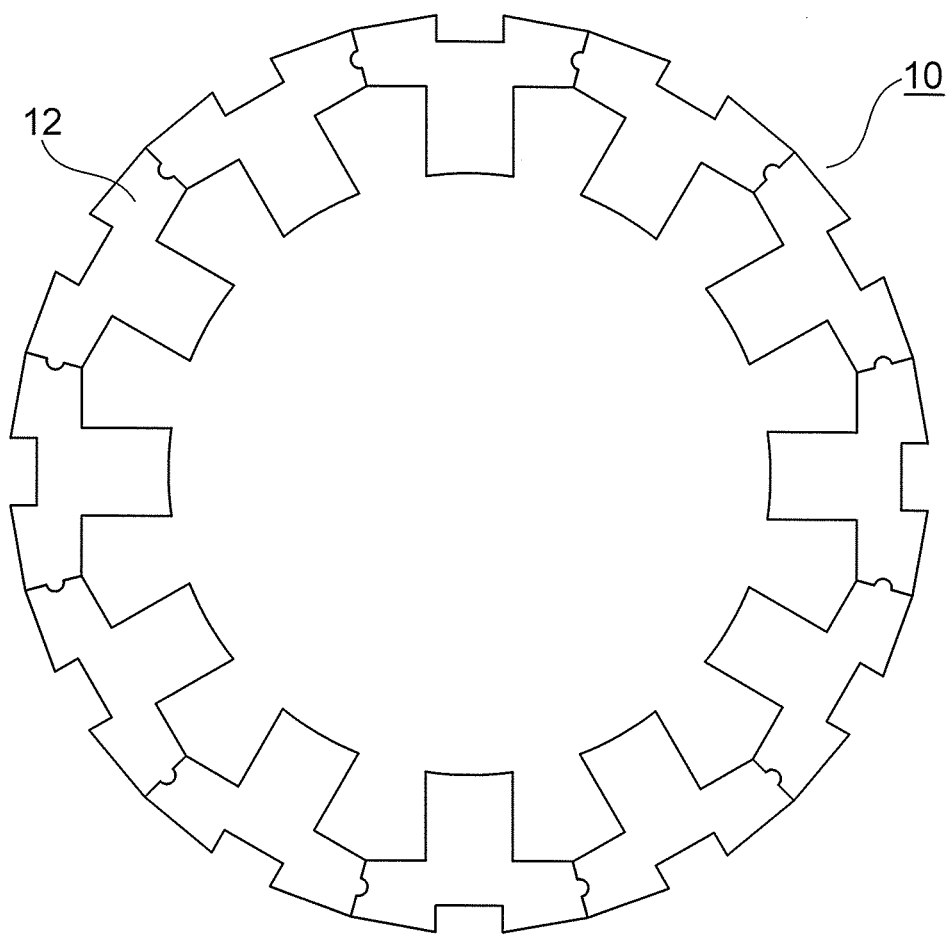
FIG. 2 is a cross section that is perpendicular to a shaft axis of a stator core from FIG. 1.

As shown in FIG. 2, the stator core 10 is configured by disposing a plurality of (in this example, twelve) segmented cores 12 into an annular shape so as to be linked to each other. Each of the segmented cores 12 is configured by laminating a plurality of electromagnetic steel sheets in an axial direction of the stator core 10.

The outer circumferential surface of the stator core 10 is fitted inside the stator core holding frame 9 so as to have a predetermined interference. In a rotary electric machine in which generated torque is approximately 100 N·m, the range of interference is 0.02 to 0.22 mm, being also influenced by machining tolerances of the stator core holding frame 9 and the stator core 10.

The stator core holding frame 9 has: a flange portion 13 that is fixed to the second housing member 3; and a frame cylindrical portion 14 that is coupled to the flange portion 13, and that holds the stator core 10. A thickness of the flange portion 13 is greater than a thickness of the frame cylindrical portion 14.

The flange portion 13 is fixed to an end surface of the second housing member 3 on a side near the first housing member 2 by a plurality of bolts 15. The stator core holding frame 9 is thereby cantilevered on the housing 1 at a first axial end portion thereof.

The bolts 15 are disposed so as to be spaced apart from each other in a circumferential direction of the flange portion 13. A plurality of apertures 13a that allow passage of the bolts 15 are disposed on the flange portion 13. A plurality of screw-threaded apertures 3d into which the bolts 15 are screwed are disposed on the second housing member 3. The bolts 15 are disposed such that shaft axes thereof are parallel to an axial direction of the stator core holding frame 9.

The frame cylindrical portion 14 has: a frame cylindrical portion main body 14a that holds the stator core 10; and a interfitting portion 14b that is disposed on an axial end portion near the flange portion 13, and that is fitted together with the flange portion 13.

An inside diameter E of the interfitting portion 14b is larger than an inside diameter F of the frame cylindrical portion main body 14a. Overall thickness of the frame cylindrical portion 14 is uniform or approximately uniform. Thus, a stepped portion 14c is formed between the frame cylindrical portion main body 14a and the interfitting portion 14b.

An end portion of the flange portion 13 near the frame cylindrical portion 14 is fitted inside the interfitting portion 14b. The flange portion 13 and the frame cylindrical portion 14 are also integrated by welding. Moreover, the flange portion 13 and the frame cylindrical portion 14 may also be integrated by press-fitting the end portion of the flange portion 13 into the interfitting portion 14b. The flange portion 13 and the frame cylindrical portion 14 may also be integrated by using welding and press-fitting in combination.

The flange portion 13 is positioned radially relative to the second housing member 3 by mated fitting. The stator 8 is thereby positioned radially relative to the housing 1.

The entire frame cylindrical portion 14 is accommodated inside the second housing member 3. A first sealing portion 16 is disposed between the flange portion 13 and the second housing member 3. The first sealing portion 16 is disposed between faying surfaces of the flange portion 13 and the second housing member 3 that are perpendicular to the axial direction. The first sealing portion 16 is disposed continuously around an entire end surface of the second housing member 3.

A second sealing portion 17 is disposed between an outer circumferential surface of the frame cylindrical portion main body 14a and an inner circumferential surface of the second housing member 3. The second sealing portion 17 is disposed continuously around the entire inner circumferential surface of the second housing member 3. Sealing members such as O rings, for example, can be used as the first and second sealing portions 16 and 17.

A liquid coolant circuit portion 18 that is a refrigerant flow channel for passage of a refrigerant is formed between the outer circumferential surface of the frame cylindrical portion 14 and the inner circumferential surface of the second housing member 3 between the first sealing portion 16 and the second sealing portion 17.

The flange portion 13 and the frame cylindrical portion 14 are coupled within an axial range A from an end surface of the flange portion 13 at an opposite end from the frame cylindrical portion 14 to an axial end surface of the stator core 10 near the flange portion 13.

The first sealing portion 16 is disposed at a position that avoids a coupling portion D between the flange portion 13 and the frame cylindrical portion 14 within an axial range B from the axial end surface of the stator core 10 near the flange portion 13 to a faying surface of the flange portion 13 and the second housing member 3 that is perpendicular to the axial direction.

The second sealing portion 17 is disposed within an axial range C from the axial end surface of the stator core 10 near the flange portion 13 to an axial end portion of the frame cylindrical portion 14 at an opposite end from the flange portion 13.

Moreover, in order to hold the segmented cores 12 in the annular shape, the stator core holding frame 9 must be fitted onto and fixed to the outer circumferential surface of the stator core 10 so as to have a predetermined interference. It is necessary for the fixing force of the stator core 10 by the stator core holding frame 9 to be set to a magnitude that can amply tolerate input loads due to generated torque and vibration, etc., of the rotary electric machine.

At the same time, compressive stress arises in the stator core 10 due to the stator core holding frame 9 being fitted over and fixed thereto. If this compressive stress increases, core loss in the stator core 10 also increases, reducing the efficiency of the rotary electric machine.

Because of that, it is desirable to set the fixing force of the stator core holding frame 9 on the stator core 10 to a required minimum. If set such that the stator core 10 can be held when the interference is at a lower limit, the compressive stress in the stator core 10 will increase when the interference is at an upper limit.

In a rotary electric machine according to Embodiment 1 that is configured as described above, because a stator core holding frame 9 is configured by coupling a flange portion 13 that is fixed to a second housing member 3, and a frame cylindrical portion 14 that holds a stator core 10 (a two-piece construction), the flange portion 13 and the frame cylindrical portion 14 can be produced separately, enabling the thickness of the flange portion 13 to be made greater than the thickness of the frame cylindrical portion 14. The strength of the flange portion 13 can thereby be increased while cantilevering the stator core holding frame 9 on the housing 1, facilitating fixing of the stator core holding frame 9 onto the housing 1, and enabling design freedom to be increased from the viewpoint of strength.

The frame cylindrical portion 14 is required to be thin because as the thickness of the frame cylindrical portion 14 increases the compressive stress on the stator core 10 also increases. In answer to that, because the stator core holding frame 9 is made to have a two-piece construction in Embodiment 1, the thickness of the frame cylindrical portion 14 can be reduced while increasing the thickness of the flange portion 13. Because of that, deterioration in efficiency of the rotary electric machine can be prevented while improving the supporting strength of the stator core holding frame 9.

Consequently, unlike conventional industrial equipment, a rotary electric machine can be achieved that is suitable for mounting onto vehicles that are subjected to engine vibration particularly while moving such as electric vehicles (EVs), or hybrid electric vehicles (HEVs) that require vibration countermeasures, etc.

In addition, in stator core holding frames that have a single-piece construction that is produced by drawing from a steel sheet, creases are more likely to occur on the flange portion that is disposed on the axial end portion if the axial length of the rotary electric machine is long, and one problem has been that precision of the flatness of the flange portion and the squareness of the cylindrical portion is reduced. In answer to that, in stator core holding frames 9 that have a two-piece construction, because the flange portion 13 can be machined by a method that has a higher milling precision such as cutting, the problem can be overcome.

Furthermore, because a liquid coolant circuit portion 18 is formed between the stator core holding frame 9 and the second housing member 3, it is not necessary to mount a liquid coolant circuit internally inside the thickness of the housing 1. Because of that, the thickness of the housing 1 can be reduced, enabling the outside diameter of the rotary electric machine to be reduced.

Because the flange portion 13 and the frame cylindrical portion 14 are integrated by welding or press-fitting within a range A, warping that occurs due to the frame cylindrical portion 14 being integrated with the flange portion 13 can be prevented from affecting the stator core 10. Thus, deterioration in efficiency of the rotary electric machine due to increases in core loss or deterioration in cylindricalness in the stator core 10 can be prevented. Joint construction can also be simplified compared to bolt fastening, enabling the outside diameter of the rotary electric machine to be reduced.

In addition, because the stator core 10 is configured by disposing segmented cores 12 in an annular shape, one problem has been that precision of concentricity has been low, making roundness poor. However, because the stator core holding frame 9 according to Embodiment 1 avoids a frame cylindrical portion 14 that holds the stator core 10, and performs radial positioning on the housing 1 using the flange portion 13, precision of concentricity can be increased, irrespective of deformation of the frame cylindrical portion 14 due to holding the stator core 10. Because of that, noise-vibration-harshness (NVH) performance of electrically driven vehicles can be improved.

Furthermore, in rotary electric machines that are mounted to electrically driven vehicles, because the shape of the housing 1 is different for each vehicle on which they are mounted, problems also arise such as lengthening of manufacturing process time or enlargement of equipment if the stator 8 is fixed to the housing 1 by press-fitting or shrinkage fitting. In contrast to that, in Embodiment 1, because the stator core holding frame 9 is fixed to the housing 1 by bolts 15, shortening of the manufacturing process and simplification of equipment can be achieved. The operation of fixing the stator 8 to the housing 1 can also be facilitated compared to rivet fastening or spot fastening, and removal can also be facilitated.

Because a first sealing portion 16 that is installed in a range B is installed at a position that avoids a portion D where cylindricalness is poor, a sealing surface can be ensured. Because the first sealing portion 16 is disposed at a position that is close to a portion where the stator core holding frame 9 is fixed to the housing 1 by the bolts 15, a sealing construction can be achieved that is strengthened against vibration, and from which liquid coolant is less likely to leak.

In addition, if the flange portion 13 and the frame cylindrical portion 14 are integrated by welding, sealing properties between the flange portion 13 and the frame cylindrical portion 14 can be improved.

Furthermore, if the flange portion 13 and the frame cylindrical portion 14 are integrated by press-fitting, a construction can be achieved in which the connecting portion is less likely to warp.

Because at least one stepped portion 14c is disposed on the frame cylindrical portion 14, a liquid coolant circuit portion 18 can be formed between the stepped portion 14c and a second sealing portion 17. Because the inside diameter E of the interfitting portion 14b is larger than the inside diameter F of the frame cylindrical portion main body 14a, the flange portion 13 can be inserted into an inner circumferential surface of the interfitting portion 14b. Because of that, the seam at portion D where the frame cylindrical portion 14 is integrated with the flange portion 13 can be disposed on an outer circumferential side, enabling welding workability to be improved.

Embodiment 2

Figure 3:
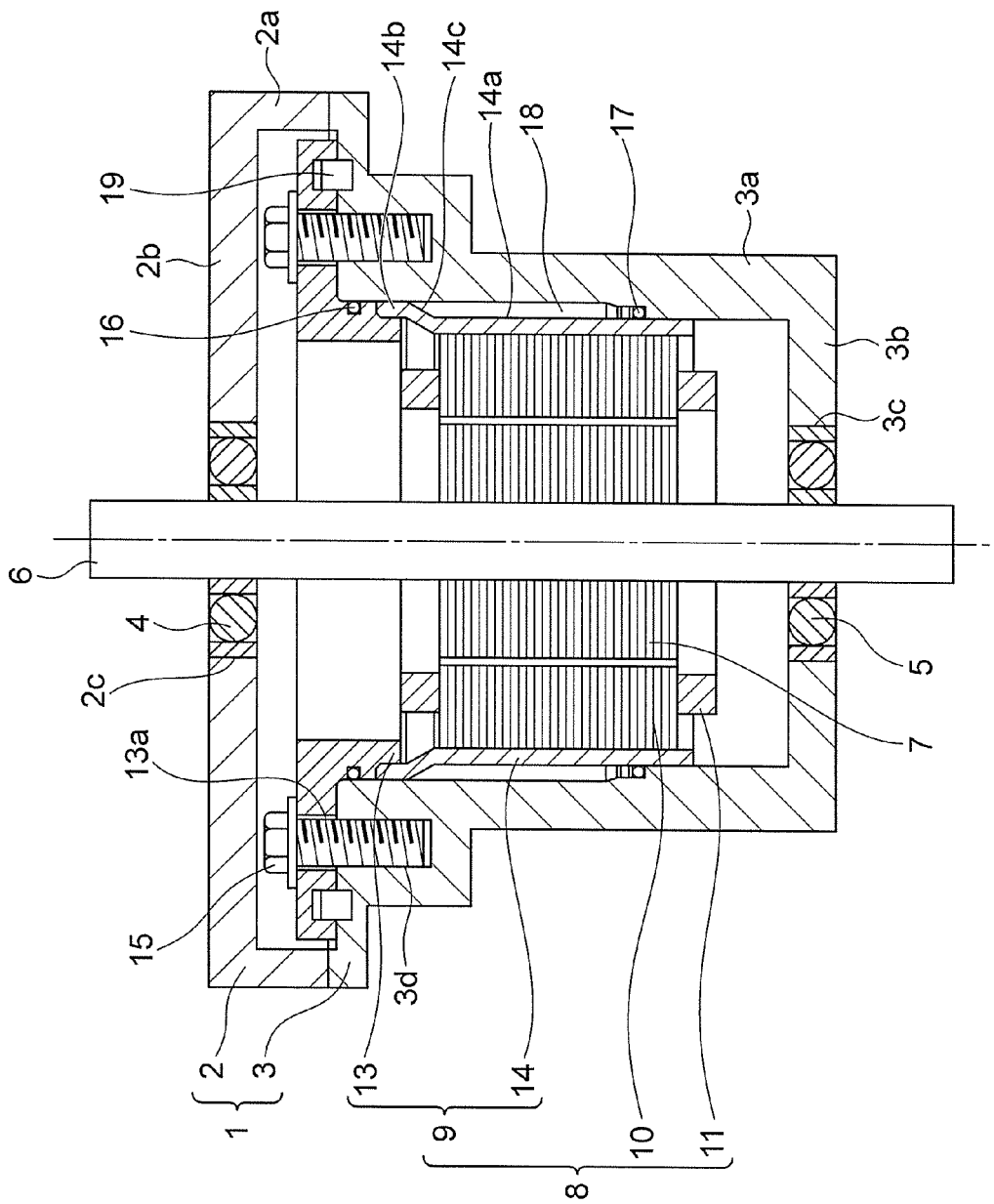
FIG. 3 is a cross section that is parallel to a shaft axis of a rotary electric machine according to Embodiment 2 of the present invention.

Next, FIG. 3 is a cross section that is parallel to a shaft axis of a rotary electric machine according to Embodiment 2 of the present invention. In this example, a flange portion 13 is positioned radially relative to a housing 1 using a plurality of positioning pins 19. The positioning pins 19 are disposed so as to be spaced apart from each other in a circumferential direction of the flange portion 13. A plurality of recess portions that are fitted together with the positioning pins 19 are respectively disposed on a faying surfaces of a second housing member 3 and the flange portion 13 that is perpendicular to an axial direction.

A first sealing portion 16 is also disposed between an inner circumferential surface of the second housing member 3 and an outer circumferential surface of the flange portion 13. The rest of the configuration and operation are similar or identical to those of Embodiment 1.

Similar effects to those in Embodiment 1 can also be achieved using this kind of configuration and fixing construction for the stator core holding frame 9.

Embodiment 3

Figure 4:
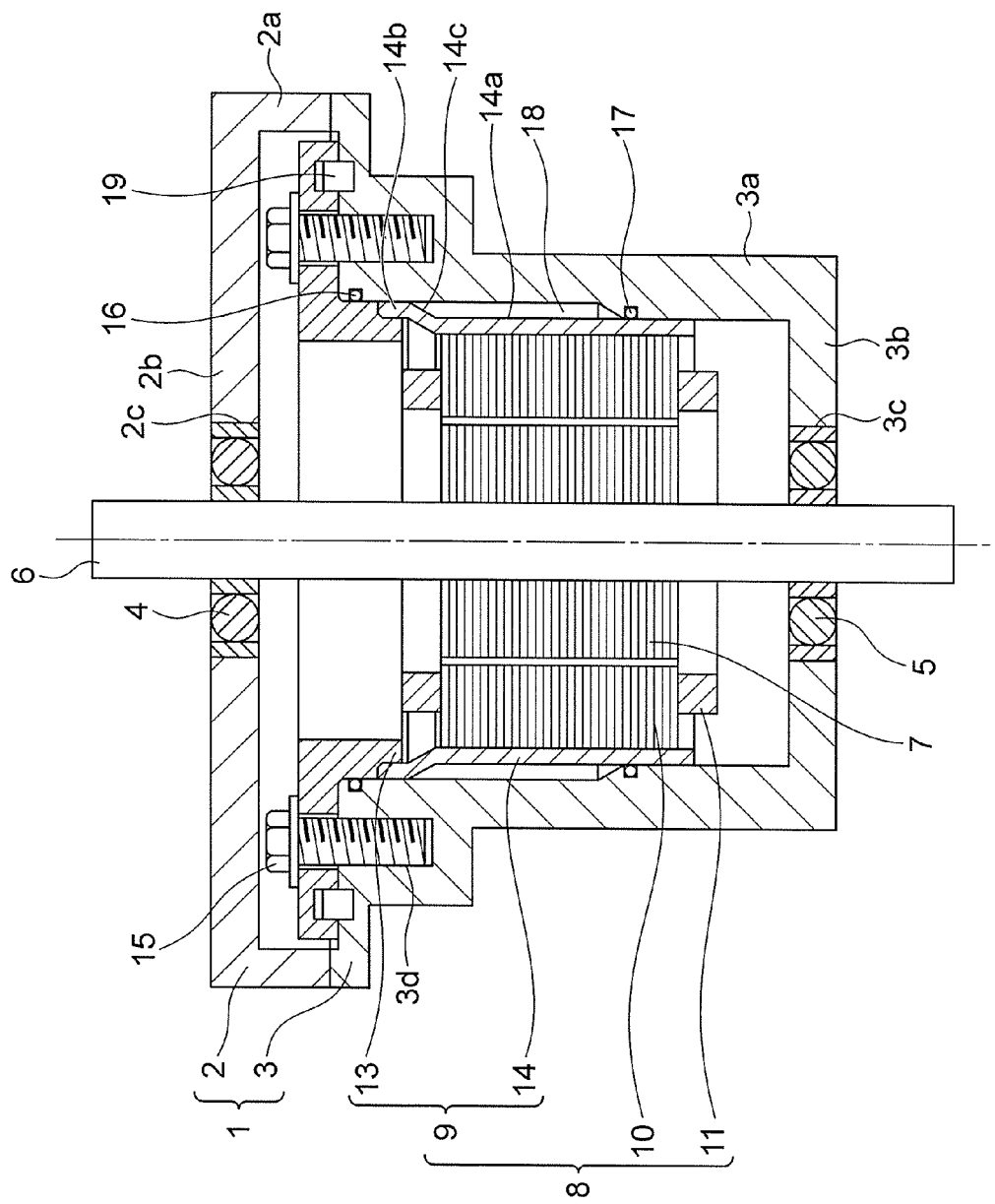
FIG. 4 is a cross section that is parallel to a shaft axis of a rotary electric machine according to Embodiment 3 of the present invention.

Next, FIG. 4 is a cross section that is parallel to a shaft axis of a rotary electric machine according to Embodiment 3 of the present invention. In Embodiment 2, the first sealing portion 16 is disposed on a side near the flange portion 13, but in Embodiment 3, a first sealing portion 16 is disposed on a side near a second housing member 3.

In Embodiment 2, the portion that accommodates the second sealing portion 17 is formed so as to be consecutive to the liquid coolant circuit portion 18, but in Embodiment 3, a groove for a second sealing portion 17 is formed independently from a liquid coolant circuit portion 18. The rest of the configuration and operation are similar or identical to those of Embodiment 2.

Similar effects to those in Embodiment 1 can also be achieved using this kind of configuration and fixing construction for the stator core holding frame 9.

Embodiment 4

Figure 5:
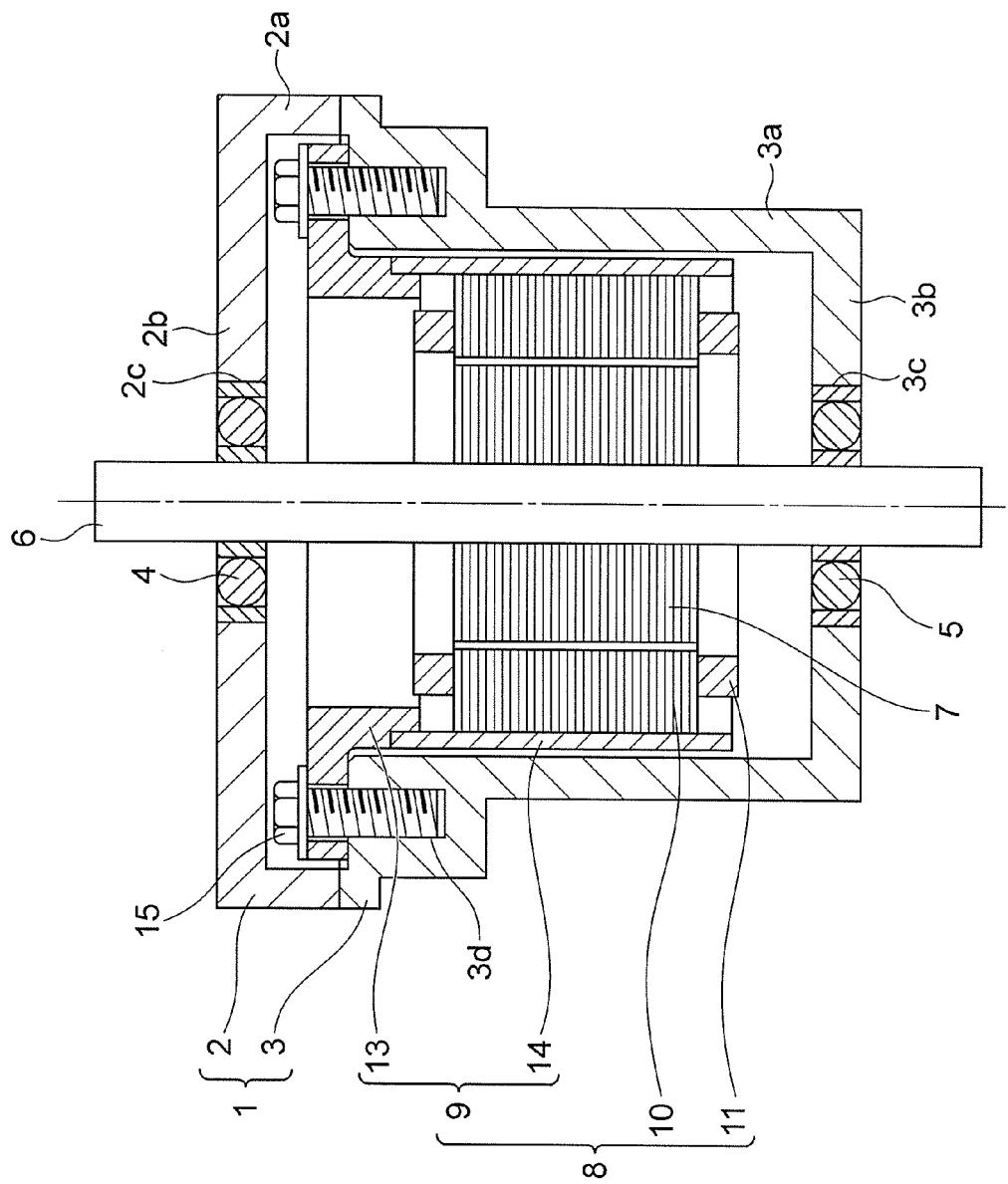
FIG. 5 is a cross section that is parallel to a shaft axis of a rotary electric machine according to Embodiment 4 of the present invention.

Next, FIG. 5 is a cross section that is parallel to a shaft axis of a rotary electric machine according to Embodiment 3 of the present invention. In this example, a stepped portion 14c is not disposed on a frame cylindrical portion 14, and a diameter of a frame cylindrical portion 14 is identical overall in an axial direction. Sealing portions 16 and 17 are also not disposed between the frame cylindrical portion 14 and a second housing member 3, and a liquid coolant circuit portion 18 is omitted. The rest of the configuration and operation are similar or identical to those of Embodiment 1.

By adopting a configuration of this kind, overall configuration is simplified, enabling cost reductions to be achieved.

Moreover, radial positioning of the flange portion 13 according to Embodiment 4 may also be performed using the positioning pins 19 that are shown in Embodiment 2.

If a refrigerant flow channel is formed, the refrigerant is not necessarily limited to a liquid coolant.

In addition, in Embodiments 1 through 3, a stepped portion 14c is formed at one axial position on the frame cylindrical portion 14, but stepped portions may also be formed at two or more positions.

Furthermore, in Embodiments 1 through 4, an end portion of the flange portion 13 is inserted inside an end portion of the frame cylindrical portion 14, but that may also be reversed.

The rotary electric machine according to the present invention is not limited to being mounted to EVs and HEVs.

What is claimed is:

1. A rotary electric machine comprising:
a housing;
a cylindrical stator core holding frame that is cantilevered on the housing;
a cylindrical stator core that comprises plurality of segmented cores that are disposed in an annular shape, and that is held by being fitted inside the stator core holding frame; and
a rotor that is rotatably disposed inside the stator core, wherein:
the stator core holding frame comprises:
a flange portion that is fixed to the housing; and
a frame cylindrical portion that is coupled to the flange portion, and that holds the stator core;
a thickness of the flange portion is greater than a thickness of the frame cylindrical portion;
a first sealing portion is disposed between the flange portion and the housing;
a second sealing portion is disposed between the frame cylindrical portion and the housing;
a refrigerant flow channel for passage of a refrigerant is formed between an outer circumferential surface of the frame cylindrical portion and an inner circumferential surface of the housing between the first sealing portion and the second sealing portion;
the frame cylindrical portion comprises:
a frame cylindrical portion main body that holds the stator core; and
an interfitting portion that is disposed on an axial end portion near the flange portion, and that is fitted together with the flange portion; and
an inside diameter of the interfitting portion is larger than an inside diameter of the frame cylindrical portion main body.

2. The rotary electric machine according to claim 1, wherein the first sealing portion is disposed at a position that avoids a coupling portion between the flange portion and the frame cylindrical portion within an axial range from an axial end surface of the stator core near the flange portion to a faying surface of the flange portion and the housing that is perpendicular to an axial direction.

3. The rotary electric machine according to claim 1, wherein the flange portion and the frame cylindrical portion are coupled within an axial range from an end surface of the flange portion at an opposite end from the frame cylindrical portion to an axial end surface of the stator core near the flange portion.

4. The rotary electric machine according to claim 1, wherein the flange portion is positioned radially relative to the housing by mated fitting.

5. The rotary electric machine according to claim 1, wherein the flange portion is positioned radially relative to the housing using a positioning pin.

6. The rotary electric machine according to claim 1, wherein the flange portion and the frame cylindrical portion are integrated by welding.

7. The rotary electric machine according to claim 1, wherein the flange portion and the frame cylindrical portion are integrated by press-fitting either one into the other.

* * * * *